United States Patent
Lee et al.

(10) Patent No.: US 9,685,255 B2
(45) Date of Patent: Jun. 20, 2017

(54) SYNERGISTIC BLENDS OF CALCIUM CARBONATE AND CALCINED CLAY

(71) Applicant: Dow Global Technologies LLC, Midland, MI (US)

(72) Inventors: Day-Chyuan Lee, Dolyestown, PA (US); Bharat I. Chaudhary, Princeton, NJ (US); Bret P. Neese, North Wales, PA (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/767,482

(22) PCT Filed: Feb. 25, 2014

(86) PCT No.: PCT/US2014/018299
§ 371 (c)(1),
(2) Date: Aug. 12, 2015

(87) PCT Pub. No.: WO2014/163871
PCT Pub. Date: Oct. 9, 2014

(65) Prior Publication Data
US 2015/0371729 A1    Dec. 24, 2015

Related U.S. Application Data

(60) Provisional application No. 61/776,441, filed on Mar. 11, 2013.

(51) Int. Cl.
| | | |
|---|---|---|
| *C08L 27/06* | (2006.01) | |
| *H01B 3/44* | (2006.01) | |
| *C08K 13/02* | (2006.01) | |
| *H01B 7/02* | (2006.01) | |
| *C08L 23/28* | (2006.01) | |
| *C08K 3/26* | (2006.01) | |

(52) U.S. Cl.
CPC ............ *H01B 3/443* (2013.01); *C08K 13/02* (2013.01); *C08L 27/06* (2013.01); *H01B 7/02* (2013.01); *C08K 2003/265* (2013.01); *C08L 23/286* (2013.01); *C08L 2203/202* (2013.01); *C08L 2207/04* (2013.01)

(58) Field of Classification Search
CPC .... C08L 27/06; C08L 91/00; C08L 2203/202; C08L 2207/04; C08L 23/286; C08K 3/26; C08K 3/346; C08K 13/02; C08K 2003/265; H01B 3/443; H01B 7/02
See application file for complete search history.

(56) References Cited

U.S. PATENT DOCUMENTS

| | | |
|---|---|---|
| 4,447,569 A | 5/1984 | Brecker et al. |
| 5,246,783 A | 9/1993 | Spenadel et al. |
| 6,496,629 B2 | 12/2002 | Ma et al. |
| 6,714,707 B2 | 3/2004 | Rossi et al. |
| 7,030,179 B2 | 4/2006 | Patterson et al. |
| 2010/0010127 A1 | 1/2010 | Barki et al. |
| 2011/0272174 A1* | 11/2011 | Chaudhary ............. C08L 27/06 174/110 SR |
| 2012/0181061 A1* | 7/2012 | Chaudhary ............. C08K 5/10 174/120 C |

FOREIGN PATENT DOCUMENTS

| | | | |
|---|---|---|---|
| CN | 102675768 A | 9/2012 | |
| WO | WO 2011041380 A1 * | 4/2011 | ............... C08K 5/10 |

OTHER PUBLICATIONS http://www.akrochem.com/pdf/product/mineral_fillers/polyfil_clays.pdf, Mar. 2010.*
http://www.hubermaterials.com/userfiles/files/PFDocs/Hubercarb%20Q%20Series%20Calcium%20Carbonate%20Products.pdf, Dec. 2013.*
http://kaolin.basf.com/products/name/satintone/satintonesp33, 2016.*

* cited by examiner

*Primary Examiner* — Satya Sastri
(74) *Attorney, Agent, or Firm* — Husch Blackwell LLP

(57) ABSTRACT

A lead-free composition comprising: (A) Polyvinyl chloride (PVC); (B) Bioplasticizer; (C) Calcium Carbonate; and (D) Calcined clay; with the combined weight of the calcium carbonate and calcined clay in the composition in the range of 1 to 15 weight percent, and the weight ratio of calcium carbonate to calcined clay in the range of 15:85 to 85:15. In one embodiment the invention is an insulation sheath for a wire or cable made from the lead-free composition described in the preceding embodiment. In one embodiment the invention is a wire or cable comprising the insulation sheath of the preceding embodiment.

8 Claims, No Drawings

SYNERGISTIC BLENDS OF CALCIUM CARBONATE AND CALCINED CLAY

FIELD OF THE INVENTION

This invention relates to wire and cable. In one aspect the invention relates to insulation sheathing for wire and cable while in another aspect, the invention relates to improving the electrical resistance of polyvinyl chloride (PVC) insulation for wire and cable.

BACKGROUND OF THE INVENTION

Flexible PVC formulations comprising plasticizers, either petroleum-based or bio-based, and calcined clay filler have relatively poor insulation resistance. Blending of components typically results in compound performance close to the average of performance of the individual components.

U.S. Pat. No. 7,030,179 teaches the optimization of calcium carbonate ($CaCO_3$) filler for a non-electrical PVC application.

U.S. Pat. No. 4,447,569 uses examples of a lead-containing composition on top of a fixed $CaCO_3$/kaolin clay composition in PVC to demonstrate that addition of magnesium oxide (MgO) at 5.0 parts per hundred resin (phr) significantly improves the volume resistivity imparted by lead nonyl phenolate. It also teaches that while basic lead silicate sulfate complex (Controls C and D in the examples) show very high volume resistivity initially, the values fall off rather rapidly upon aging. Lead nonyl phenolate with epoxy (Examples 6 to 12) offer values which are only one-third as high at 50° C., but 81% of the values at 75° C.

U.S. Pat. No. 4,447,569 focuses on the uniqueness of lead alkyl phenolate in PVC electrical performance and includes sole $CaCO_3$ and a blend of $CaCO_3$/kaolin clay in the absence of lead alkyl phenolate as a control, but it offers no comparison with the sole use Kaolin clay as a filler.

There are environmental concerns for the use of lead-containing ingredients. Of current commercial interest are environmental friendly non-lead containing formulations that demonstrate enhanced electrical thermoplastic high heat-resistant nylon-coated (THHN) performance.

SUMMARY OF THE INVENTION

In one embodiment the invention is a PVC wire insulation containing bioplasticizers that are synergistically improved by using a blend of $CaCO_3$ and calcined clay. The invention demonstrates that the electrical performance of PVC compound containing bioplasticizer is much improved when filler $CaCO_3$ is used in conjunction with Kaolin clay as compared to the sole use of either $CaCO_3$ or Kaolin clay as a control. This is important, because this synergistic performance ensures that the compound can pass THHN cable specification with enhanced performance at favorable cost.

In one embodiment the invention is a lead-free composition comprising:
(A) Polyvinyl chloride (PVC);
(B) Bioplasticizer;
(C) Calcium Carbonate; and
(D) Calcined clay;
the combined weight of the calcium carbonate and calcined clay in the composition in the range of 1 to 15 weight percent, and the weight ratio of calcium carbonate to calcined clay is in the range of 15:85 to 85:15.

In one embodiment the invention is an insulation sheath for a wire or cable made from the lead-free composition described in the preceding embodiment.

In one embodiment the invention is a wire or cable comprising the insulation sheath of the preceding embodiment.

DETAILED DESCRIPTION OF THE PREFERRED EMBODIMENT

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the relative amounts of calcium carbonate and calcined clay.

"Comprising", "including", "having" and like terms mean that the composition, process, etc. is not limited to the components, steps, etc. disclosed, but rather can include other, undisclosed components, steps, etc. In contrast, the term "consisting essentially of" excludes from the scope of any composition, process, etc. any other component, step etc. excepting those that are not essential to the performance, operability or the like of the composition, process, etc. The term "consisting of" excludes from a composition, process, etc., any component, step, etc. not specifically disclosed. The term "or", unless stated otherwise, refers to the disclosed members individually as well as in any combination.

"Cable", "power cable" and like terms means at least one conductive wire or optical fiber within a protective jacket or sheath. Typically a cable is two or more wires or optical fibers bound together, typically in a common protective jacket or sheath. The individual wires or fibers may be bare, covered or insulated. Combination cables may contain both electrical wires and optical fibers. The cable, etc., can be designed for low, medium or high voltage applications. Typical cable designs are illustrated in U.S. Pat. Nos. 5,246,783, 6,496,629 and 6,714,707.

Polyvinyl Chloride Resins

The polyvinyl chloride resin (also referred to as a vinyl chloride polymer) component of the present compositions is a solid, high molecular weight polymer that may be a polyvinyl chloride homopolymer or a copolymer of vinyl chloride having copolymerized units of one or more additional comonomers. A commercially available example of a PVC homopolymer is Oxy Vinyls 240F, available from Oxy Vinyls, LP. When present, comonomers will typically account for up to 20 weight percent of the copolymer. Examples of suitable comonomers include $C_2$-$C_6$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid imide as well as the N-substitution products of maleic acid imide with aromatic, cycloaliphatic and optionally branched aliphatic substituents; acrylonitrile and styrene. Graft copolymers of vinyl chloride are also suitable for use in the compositions. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component.

The compositions will typically include 20 to 80 weight percent polyvinyl chloride resin, based on the total weight of the composition. This includes embodiments in which the composition includes 25 to 75 weight percent polyvinyl chloride resin, based on the total weight of the composition and further includes embodiments in which the composition includes 30 to 60 weight percent vinyl chloride resin, based on the total weight of the composition.

Thermoplastic Elastomers

The compositions optionally include one or more thermoplastic elastomers which can act as impact modifiers. The inclusion of such elastomers can be desirable if the composition is intended for use in an application that requires significant flexibility. An "elastomer" is a rubber-like polymer which can be stretched to at least twice its original length and which retracts very rapidly to approximately its original length when the force exerting the stretching is released. An elastomer has an elastic modulus of about 10,000 psi (68.95 MPa) or less and an elongation usually greater than 200% in the uncrosslinked state at room temperature using the method of ASTM D638-72. A "thermoplastic elastomer" (TPE) is a material that has the properties of an elastomer but can be processed like a thermoplastic. TPEs are generally made by special block copolymerization or graft polymerization or blending of two polymers. In each case the thermoplastic elastomer contains at least two segments, one of which is thermoplastic and the other elastomeric.

Thermoplastic polyolefin elastomers are examples of thermoplastic elastomers that are suitable for use in the present composition. "Polyolefin", "PO" and like terms mean a polymer derived from simple olefins. Polyolefin elastomer such as ethylene/alpha-olefin copolymers are copolymers of ethylene with at least one $C_3$-$C_8$ alpha-olefin (preferably an aliphatic alpha-olefin) comonomer, and optionally, a polyene comonomer, e.g., a conjugated diene, a nonconjugated diene, a triene, etc. Examples of the $C_3$-$C_8$ alpha-olefins include propene, 1-butene, 4-methyl-1-pentene, 1-hexene, and 1-octene. The alpha-olefin can also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and can be used in place of some or all of the alpha-olefins described above. Similarly, styrene and its related olefins (e.g., alpha-methylstyrene, etc.) are alpha-olefins for purposes of this invention. Exemplary copolymers include ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene.

If the present compositions include a thermoplastic elastomer, they will generally comprise no greater than 40 weight percent thermoplastic elastomer, based on the total weight of the composition. This includes compositions that include no greater than 35 weight percent thermoplastic elastomer and further includes compositions that include no greater than 30 weight percent thermoplastic elastomer, based on the total weight of the composition. Typical ranges for the weight percentage of thermoplastic elastomer in the compositions, based on the total weight of the composition, are 10 to 40 weight percent, 15 to 35 weight percent and 20 to 30 weight percent.

FLEXALLOY®, available from Teknor Apex, is an example of a commercially available blend of PVC resin, thermoplastic elastomer and compatibilizer.

Compatibilizer

Compatibilizers are used to enhance the miscibility of the PVC resin and other polymer components, such as the thermoplastic elastomers. However, in the present compositions, the compatibilizer can also serve to compatibilize the biochemical plasticizers with the PVC resin to an extent sufficient to allow them to serve as the primary, or in some case, the only, plasticizers in the compositions. Therefore, in the present compositions the compatibilizers are useful even the absence of the thermoplastic elastomer component.

The compatibilizers can also act as impact modifiers in the compositions. For purposes of clarity, the weight percentages of thermoplastic elastomers mentioned above, do not include any thermoplastic elastomeric compatibilizers.

Examples of suitable compatibilizers include, but are not limited to, chlorinated polyolefins, ethylene vinyl acetate copolymers, ethylene methyl acrylate copolymers, ethylene butyl acrylate copolymers, ethylene/acetate/carbon monoxide terpolymers, ethylene/acrylate/carbon monoxide terpolymers, polyvinylidene fluoride, nitrile butadiene rubber, epoxidized polybutadiene, epoxidized natural rubber, poly (tetramethylene oxide), glutarimide copolymers, thermoplastic polyurethane, and chlorinated polyurethane. The chlorinated polyolefin component of the compositions can be, for example, a) a chlorinated polyethylene homopolymer, b) a chlorinated copolymer that contains copolymerized units of i) ethylene and ii) a copolymerizable monomer, or c) a combination thereof. Representative chlorinated olefin polymers include a) chlorinated homopolymers of ethylene and b) chlorinated copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Chlorinated graft copolymers are included as well. Specific examples of suitable polymers include chlorinated polyethylene (CPE); chlorinated ethylene vinyl acetate copolymers; chlorinated ethylene acrylic acid copolymers; chlorinated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; and chlorinated copolymers of ethylene with propylene, butene, 3-methyl-1-pentene, or octene. The copolymers may be dipolymers, terpolymers, or higher order copolymers. Preferred chlorinated olefin polymers are chlorinated polyethylene and chlorinated copolymers of ethylene vinyl acetate. An example of a commercially available chlorinated polyethylene compatibilizer is TYRIN® 4211P CPE, available from The Dow Chemical Company.

When CPE is used as the compatibilizer, it is preferred that the CPE has a chlorine content of about 5% to about 50% by weight. The higher the chlorine content of the CPE, the better its miscibility or compatibility with the PVC. The compositions typically contain 1 to 30 weight percent compatibilizer, based on the total weight of the composition. This includes compositions that include 2 to 20 weight percent compatibilizer, based on the total weight of the composition, and further includes compositions that include 3 to 16 weight percent compatibilizer, based on the total weight of the composition.

Biochemical Plasticizers

A "plasticizer" is a substance that lowers the modulus and tensile strength, and increases flexibility, elongation, impact strength, and tear-strength of the PVC resin to which it is added. A plasticizer may also lower the melting point of the PVC resin, lower the glass transition temperature and enhance processability of the PVC resin to which it is added.

Biochemical plasticizers are plasticizers that are derived from renewable, natural raw materials, such as plant oils. The compositions can include a single biochemical plasticizer or a blend of two or more biochemical plasticizers. U.S. Patent Application Publication No. 2010/0010127 describes biochemical plasticizers ("bioplasticizers") and methods of their production.

Epoxidized vegetable oils, such as epoxidized soybean oil and epoxidized linseed oil, are examples of biochemical plasticizers that can be included in the present compositions. For the purposes of this disclosure, a plasticizer is epoxidized if it contains at least one epoxide group. An "epoxide group" is a three-membered cyclic ether (also called oxirane or an alkylene oxide) in which an oxygen atom is joined to each of two carbon atoms that are already bonded to each other.

Esters of vegetable oil-derived fatty acids, such as epoxidized fatty acid methyl esters, are other examples of suitable biochemical plasticizers. Fatty acid esters can be derived from the reaction of an alcohol with fatty acids derived from renewable sources, such as plant oils. Epoxidized soybean fatty acid esters are an example of a suitable biochemical plasticizer belonging to this group.

Acetylated waxes and oils derived from plants are another class of biochemical plasticizers that can be included in the present compositions. Acetylated castor wax is an example of one suitable wax. Acetylated castor oil is an example of one suitable oil. Commercially available acetylated castor waxes, oils and other derivatives include FLEXRICIN® P-8 and PARICIN® 8, available from Vertellus Specialties, Inc. and Grindsted Soft-N-Safe, available from Danisco.

One or more biochemical plasticizers are used as primary plasticizers in the present compositions. For the purposes of this disclosure, plasticizers are primary plasticizers if they have sufficient miscibility or compatibility in the resin composition that they can be the majority, or even the sole, plasticizers in the composition. Thus, in some embodiments, biochemical plasticizers account for at least 50 percent by weight of the total plasticizer in the composition. In some embodiments of the compositions, biochemical plasticizers account for at least 90 percent by weight of the total plasticizer in the composition. Epoxidized derivatives of vegetable oils, acetylated derivatives of vegetable oils and mixtures thereof are particularly useful as biochemical plasticizers.

The compositions contain significant quantities of the biochemical plasticizers. For example, in some embodiments, the compositions include 5 to 60 weight percent biochemical plasticizer, based on the total weight of the composition. This includes embodiments in which the composition includes 7 to 50 weight percent biochemical plasticizer, based on the total weight of the composition, and further includes an embodiment in which the composition includes 10 to 40 weight percent biochemical plasticizer, based on the total weight of the composition.

In some embodiments, the compositions are free of plasticizers derived from petrochemicals, such as phthalates, trimetallitates, and adipic polyesters. The term "phthalate-free composition," as used herein, is a composition that is devoid of phthalate. A "phthalate," is a compound which includes the following structure (I):

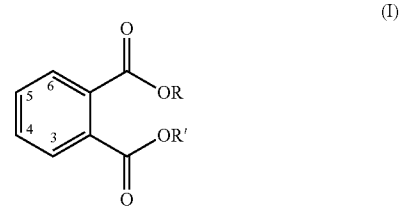

wherein R and R' may be the same or different. Each of R and R' is selected from a substituted-/unsubstituted-hydrocarbyl group having 1 to 20 carbon atoms. As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups. Each position 3, 4, 5, and 6 may be populated by hydrogen or another moiety.

In some embodiments the compositions are substantially free of non-biochemical plasticizers. A composition is considered to be substantially free of non-biochemical plasticizers if the composition is free of non-biochemical plasticizer, or if the amount of non-biochemical plasticizer present in the composition is considered inconsequential to the efficacy of the composition.

Calcium Carbonate and Calcined Clay

Calcium carbonate is a chemical compound with the formula $CaCO_3$. It is widely commercially available in various grades of purity and in various particle sizes. It is used in the practice of this invention in known quantities and in known ways. While the average particle size ("PS") can vary, typically it is less than 100 microns to avoid surface roughness upon extrusion of the PVC composition. If the $CaCO_3$ particle size is smaller than 0.1 micron then the powder will be quite dusty and making handling difficult. Preferably the $CaCO_3$ has a mean PS of about 0.5 to 2.0 microns and is used in amounts in the range of 3 to 15, preferably from 5 to 10, weight percent based on the total weight of the PVC composition. The particles are generally spherical in shape. Typically, the $CaCO_3$ has a purity of at least 90, more typically at least 95 and even more typically at least 98, percent.

The clays that can be used in the practice of this invention are calcined and can be treated or not treated. Calcined clay is clay that has been treated, e.g., heated, to drive off volatile compounds. Representative clays include, but are not limited to montmorillonite, nontronite, beidellite, volkonskoite, hectorite, saponite, sauconite; vermiculite; halloisite; sericite; or their mixtures. Treated or untreated, calcined montmorillonite is particularly preferred. The various CLOISITE clays are representative of the treated montmorillonite clays that can be used in the practice of this invention.

The clay is used in amounts ranging from 0.15 to 12.75, typically from 0.3 to 11.25 and even more typically from 0.45 to 8.25, weight percent based on the total weight of the PVC composition. Typically and preferably the PS of the clay is the same or near the same as that of the $CaCO_3$. The weight ratio of $CaCO_3$ to calcined clay is typically in the range of 15:85 to 85:15, more typically 30:70 to 70:30 and even more typically 45:55 to 55:45. The typical total $CaCO_3$ and calcined clay loading of the PVC composition is 1 to 15, more typically 2 to 13 and even more typically 3 to 11, weight percent based on the total weight of the PVC composition.

Additional Filler and Additives

The compositions can additionally contain other fillers and additives, although additional fillers are usually not necessary in view of presence of both the $CaCO_3$ and calcined clay. If present, other useful fillers include silica, titanium dioxide, talc, and other like mineral fillers. The compositions can additionally contain other compounding ingredients such as thermal- and light-stabilizers, blowing agents, lubricants, pigments, colorants, processing aids, antioxidants, crosslinking agents, flame-retardants, anti-drip agents, curing agents, boosters and retardants, coupling agents, antistatic agents, nucleating agents, slip agents, viscosity control agents, tackifiers, anti-blocking agents, surfactants, extender oils, acid scavengers, metal deactivators, and the like. The use of such additional components permits the compositions to be tailored for use in various applications. Particularly useful compounding ingredients include tin, barium/zinc and calcium/zinc thermal stabilizers. If additives and other fillers are present, they typically account for no greater than about 15 weight percent of the PVC composition, based on the total weight of the composition. This includes compositions that include no greater than 10, and no greater than 5, and no greater than 2, and no greater than 1, weight percent additives and other fillers, based on the total weight of the composition.

Absence of Lead Compounds

The PVC compositions of this invention are free of lead-containing components, particularly lead additives such as lead alkyl phenolates, lead silicate sulfate complexes and the like. By "free of" is meant that the lead-containing components are not intentionally added as a component of the PVC composition. However, some lead may be present as a contaminant associated with one or more of the components of the composition or a contaminant acquired during the mixing or processing of the composition from equipment or an environmental source. Lead present from such sources is typically present in an amount of less than 0.1 weight percent based on the total weight of the composition.

Compounding

The PVC compositions are generally prepared according to conventional dry blend or wet blend methods known to those skilled in the art of PVC compounding. The mixtures obtained from the blending process can be further compounded with a mixer such as a Banbury batch mixer, a Farrel Continuous Mixer, or a single or twin screw extruder.

In an embodiment, the present PVC composition is made by absorption of the biochemical plasticizers in PVC powder to make a dry blend. Any suitable method/apparatus may be used to make the dry blend including, but not limited to, a Brabender mixer, a Henschel mixer or a ribbon blender. The polymeric composition may contain other additives in addition to the PVC and the biochemical plasticizer. The dry blend may then be further compounded (via melt extrusion for example) and formed into any desired shape (film, pellet, etc.).

Articles

Another aspect of the invention provides articles, such as molded or extruded articles, comprising one or more compositions of the present invention.

Articles include wire and cable jackets and insulation. Thus, in some embodiments, the article includes a metal conductor and a coating on the metal conductor to provide an "insulated" wire capable of electrical transmission. A "metal conductor," as used herein, is at least one metal component used to transmit either electrical power and/or electrical signals. Flexibility of wire and cables is often desired, so the metal conductor can have either a solid cross-section or can be composed of smaller wire strands that provide increased flexibility for the given overall conductor diameter. Cables are often composed of several components such as multiple insulated wires formed into an inner core, and then surrounded by a cable sheathing system providing protection and cosmetic appearance. The cable sheathing system can incorporate metallic layers such as foils or armors, and typically has a polymer layer on the surface. The one or more polymer layers incorporated into the protective/cosmetic cable sheathing are often referred to as cable "jacketing". For some cables, the sheathing is only a polymeric jacketing layer surrounding a cable core. There are also some cables having a single layer of polymer surrounding the conductors, performing both the roles of insulation and jacketing. The present compositions may be used as, or in, the polymeric components in a full range of wire and cable products, including power cables and both metallic and fiber optic communication applications.

The following examples illustrate certain embodiments of the present invention. Unless otherwise noted, all parts and percentages are by weight.

Specific Embodiments

Table 1 reports the compositions used in these examples. Acetylated castor wax (ACW) and epoxidized soybean oil (ESO) are heated to 60° C. for a minimum of 1 hour, shook, and combined to make a LPLAS HT plasticizer mixture. The solids mixture is made by mixing everything except the plasticizer, clay, and antimony trioxide in a container by hand. A 250 cm$^3$ BRABENDER mixing bowl with sigma blades is used at 90° C. and 40 rpm to mix the dry blend. The mixer is first pre-heated for 2 minutes, and then the solids mixture are added and mixed for 60 seconds. The plasticizer is then added and mixed for 10 minutes. The clay and antimony trioxide are then added and mixed for 60 seconds. The mixer is then stopped and the dry blend removed.

Melt mixing is also conducted in a 250 cm$^3$ BRABENDER mixing bowl with cam rotors at 40 rpm. The dry blend is added to the mixer and mixed at 180° C. for 10 minutes from the time of loading.

The compound is pelletized in a conical twin screw extruder with a temperature profile of 160, 165, 170, 175° C. and at 45 rpm. There is a 15 second transition and the extruder is run dry between samples.

The melt mixed PVC compound pellets are compression molded into plaques at 180° C. for 5 minutes (2 minutes at approximately 500 psi, followed by 3 minutes at approximately 2000 psi). The plaques are then removed from the platens and the samples are cooled to determine volume resistivity.

A BRABENDER extruder with a 25:1 single screw extruder and mini wire line is used to fabricate the wires. The extruder is set at 40 rpm and a temperature profile of 170, 175, 180, 185° C. The conductor is 0.064" (14 AWG) solid copper conductor and the insulation thickness is approximately 0.015". The conductor is preheated with hot air guns and 100 feet of coated wire is collected. The wires are used to determine insulation resistance.

Volume resistivity (VR) tests are carried out at room temperature (23° C.) and humidity, in accordance with ASTM D 257. The specimens (40 mil of 4 inch×4 inch square) obtained from compression molding are cut to 3.5 inch diameter by using the disk shaped cutting die. Five thickness readings are taken for each sample from five different positions. Samples are placed in a HEWLETT PACKARD (HP) 16008A Resistivity Cell of HP 4329A High Resistance meter and 500 volts direct current is applied to the sample for 45 seconds to measure the volume resistance of the sample.

The VR data in Table 1 demonstrates that blends of $CaCO_3$ and kaolin clay results in a much better volume resistivity (VR) than the arithmetic average of $CaCO_3$ and kaolin clay (SATINTONE SP-33).

TABLE 1

Example Compositions and Volume Resistivity

|  | Comparative Sample 1 (CS1) | Comparative Sample 2 (CS2) | Example 1 (Ex. 1) | Example 2 (Ex. 2) | Example 3 (Ex. 3) | Example 4 (Ex. 4) | Example 5 (Ex. 5) |
|---|---|---|---|---|---|---|---|
| PVC (OxyVinyls ® 240F) | 60.3 | 60.3 | 60.3 | 60.3 | 60.3 | 60.3 | 60.3 |
| LPlas HT EXP 1 - Royal Castor 09/10 (ACW) | 13.5 | 13.5 | 13.5 | 13.5 | 13.5 | 13.5 | 13.5 |
| Plas-Chek ® 775 ESO | 13.5 | 13.5 | 13.5 | 13.5 | 13.5 | 13.5 | 13.5 |
| Satintone ® SP-33 Clay | 6.4 |  | 1.28 | 2.24 | 3.2 | 4.16 | 5.12 |
| Omyacarb fT |  | 6.4 | 5.12 | 4.16 | 3.2 | 2.24 | 1.28 |
| Baeropan ® MC 90249 KA | 3.0 | 3.0 | 3.0 | 3.0 | 3.0 | 3.0 | 3.0 |
| Irganox ® 1076 | 0.3 | 0.3 | 0.3 | 0.3 | 0.3 | 0.3 | 0.3 |
| Microfine ® AO9 Antimony Trioxide | 3.0 | 3.0 | 3.0 | 3.0 | 3.0 | 3.0 | 3.0 |
| TOTAL (wt %) | 100.0 | 100.0 | 100.0 | 100.0 | 100.0 | 100.0 | 100.0 |
| VR, Ohm cm -dry at 25° C. | 8.13E+14 | 4.12E+14 | 1.04E+15 | 1.64E+15 | 1.56E+15 | 2.33E+15 | 2.16E+15 |
| % clay [=clay/(clay + CaCO3) * 100] | 100 | 0 | 20 | 35 | 50 | 65 | 80 |
| VRcalc = VRclay * % clay + VRCaCO3 * (1 − % Clay) | 8.13E+14 | 4.12E+14 | 4.92E+14 | 5.52E+14 | 6.13E+14 | 6.73E+14 | 7.33E+14 |

OXYVINYLS 240° F. PVC is a polyvinyl chloride homopolymer available from OxyVinyls, LP.
LPLAS HT EXP1 is a medium viscosity liquid, low volatility, high temperature (up to 136° C.) bio-based plasticizer compatible with PVC and available from The Dow Chemical Company.
PLAS-CHEK 775 ESO is epoxidized soybean oil available from Ferro Corporation.

SATINTONE SP-33 Clay is a fine particle size, low brightness grade Kaolin clay designed for use in medium to high-voltage PVC wire insulation compounds and is available from BASF.

OMYACARB FT is a high purity, fine, wet ground, surface treated natural calcium carbonate available from Omya, Inc.

BAEROPAN MC 90249 KA is a calcium-zinc heat stabilizer available from Baerlocher.

IRGANOX 1076 is a hindered phenolic antioxidant available form Ciba Chemicals.

MICROFINE® AO9 is a sub-micron particle size antimony trioxide with an average particle size of 0.9 microns and available from Chemtura.

Insulation Resistance (IR) is conducted in accordance with UL 83/2556, on 10 foot length of coiled wire aged in a box of aluminum shot at 97° C. and connected to a megohmmeter. A voltage of 500 volts is applied for 60 seconds and the direct current (DC) resistance is measured with a QUADTECH 1868a insulation resistance measuring instrument. At 97° C. the initial measurement is taken after 24 hours (without applied voltage) and all subsequent measurements are taken at 7 days frequency (while the sample is aged continuously under 600V alternating current) for 3 weeks. The resistance measurement is obtained in ohms/10 ft and converted to megaohms/1000 ft by first dividing by 100 and then dividing by 1,000,000.

The data in Table 2 shows that the aged wire dry-IR values of blends of $CaCO_3$ and kaolin clay also results in a much better IR than the arithmetic average of $CaCO_3$ and kaolin clay (SATINTONE SP-33). This is important for THHN applications.

TABLE 2

Insulation Resistance

|  | Comparative Sample 1 (CS1) | Comparative Sample 2 (CS2) | Example 1 (Ex. 1) | Example 2 (Ex. 2) | Example 3 (Ex. 3) | Example 4 (Ex. 4) | Example 5 (Ex. 5) |
|---|---|---|---|---|---|---|---|
| 1 day IR (Megaohms/1000 ft at 97° C.) | 4.59E+08 | 3.02E+08 | 4.19E+08 | 5.61E+08 | 5.76E+08 | 6.24E+08 | 4.37E+08 |
| 7 day IR (Megaohms/1000 ft at 97° C.) | 4.38E+08 | 2.24E+08 | 4.07E+08 | 5.42E+08 | 5.54E+08 | 5.23E+08 | 4.11E+08 |
| 14 day IR (Megaohms/1000 ft at 97° C.) | 6.21E+08 | 3.00E+08 | 6.75E+08 | 7.39E+08 | 7.64E+08 | 8.72E+08 | 6.83E+08 |
| 21 day IR (Megaohms/1000 ft at 97° C.) | 8.00E+08 | 3.07E+08 | 7.66E+08 | 9.93E+08 | 1.01E+09 | 1.06E+09 | 8.77E+08 |
| % clay [=clay/(clay + CaCO3) * 100] | 100 | 0 | 20 | 35 | 50 | 65 | 80 |
| 1 day IRcalc = IRclay * % clay + IRCaCO3 * (1 − % Clay) | 4.59E+08 | 3.02E+08 | 3.33E+08 | 3.57E+08 | 3.81E+08 | 4.04E+08 | 4.28E+08 |
| 7 day IRcalc = IRclay * % clay + IRCaCO3 * (1 − % Clay) | 4.38E+08 | 2.24E+08 | 2.67E+08 | 2.99E+08 | 3.31E+08 | 3.63E+08 | 3.95E+08 |
| 14 day IRcalc = IRclay * % clay + IRCaCO3 * (1 − % Clay) | 6.21E+08 | 3.00E+08 | 3.64E+08 | 4.12E+08 | 4.61E+08 | 5.09E+08 | 5.57E+08 |
| 21 day IRcalc = IRclay * % clay + IRCaCO3 * (1 − % Clay) | 8.00E+08 | 3.07E+08 | 4.06E+08 | 4.80E+08 | 5.54E+08 | 6.27E+08 | 7.01E+08 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

We claim:

1. A lead-free composition comprising:
   (A) Polyvinyl chloride (PVC);
   (B) Bioplasticizer;
   (C) Calcium Carbonate; and
   (D) Calcined clay;
with the provisos that (1) the combined weight of the calcium carbonate and calcined clay in the composition in the range of 1 to 15 weight percent, (2) the weight ratio of calcium carbonate to calcined clay is in the range of 15:85 to 85:15, (3) the calcium carbonate has a mean particle size of 0.5 to 2.0 microns, (4) the calcium carbonate and calcined clay are of approximately the same mean particle size and (5) the volume resistivity (VR) as measured by ASTM D257 is greater than or equal to 1.04E+15 ohm-cm.

2. The composition of claim 1 in which the PVC is present in an amount of 20 to 80 weight percent.

3. The composition of claim 2 in which the bioplasticizer is present in an amount of 5 to 60 weight percent.

4. The composition of claim 3 in which the bioplasticizer is at least one of an epoxidized vegetable oil, an ester of vegetable oil-derived fatty acid, and an acetylated wax or oil derived from a plant.

5. The composition of claim 1 in which the calcined clay is a montmorillonite clay.

6. The composition of claim 1 further comprising a thermoplastic elastomer and a compatibilizer.

7. An insulation sheath for a wire or cable, the sheath made from the composition of claim 1.

8. A wire or cable comprising the insulation sheath of claim 7.

* * * * *